United States Patent [19]

Bakker

[11] Patent Number: 4,457,225
[45] Date of Patent: Jul. 3, 1984

[54] APPARATUS FOR THE PREPARATION OF A FOODSTUFF CONSISTING OF A STUFFING ROLLED IN A WRAP

[75] Inventor: Arie Bakker, Gouda, Netherlands

[73] Assignee: Barnach, B. V., Lekkerkerk, Netherlands

[21] Appl. No.: 241,927

[22] Filed: Mar. 9, 1981

Related U.S. Application Data

[62] Division of Ser. No. 40,766, May 21, 1979, abandoned.

[51] Int. Cl.³ .......................... A21C 9/00; A21C 9/06
[52] U.S. Cl. .................................. 99/450.6; 99/450.1; 99/450.7; 426/502
[58] Field of Search ............................ 99/450.1–450.8, 99/352–356, 404, 407, 427; 53/465, 461, 216, 211, 210, 266 R; 229/87 R, 87 F; 426/410, 92, 94, 128, 129, 130, 138, 297, 282–284, 391, 500, 501, 502, 414, 275; 141/158, 168; 425/511, 515

[56] References Cited

U.S. PATENT DOCUMENTS

| 2,905,105 | 9/1959 | Lombi | 99/450.6 |
| 3,669,007 | 6/1972 | Pulici | 99/450.6 |
| 4,047,478 | 9/1977 | Trostmann et al. | 99/450.1 |
| 4,084,493 | 4/1978 | Quintana | 99/450.7 |

Primary Examiner—Timothy F. Simone
Attorney, Agent, or Firm—Robert T. Gammons

[57] ABSTRACT

A process for preparing a foodstuff, like for instance a meat bird, comprising folding of a wrap around a stuffing, whereby the wrap is wider at one end than at the opposite end, the stuffing being deposed on the wrap at the wide end of the wrap and folding onto the upper side of the stuffing those parts of the wider end of the wrap which protrude beyond the stuffing, after which the stuffing with the thus folded wide end of the wrap are rolled up towards the narrower end of the wrap such that the wrap is rolled around the stuffing.

5 Claims, 14 Drawing Figures

APPARATUS FOR THE PREPARATION OF A FOODSTUFF CONSISTING OF A STUFFING ROLLED IN A WRAP

This is a division, of application Ser. No. 040,766 filed May 21, 1979, abandoned.

The present invention relates to a process and an apparatus for the preparation of a foodstuff consisting of a stuffing rolled in wrap.

When preparing such a foodstuff, like for instance a meat bird, the wrap which consists of a slice of meat in the event a meat bird is being prepared, is manually wound around the stuffing which, in the event a meat bird is being prepared, consists of for instance chopped meat. As said manual winding operation of the wrap around the stuffing implies high labour costs, the invention tends to have said winding take place mechanically.

According to the invention this is possible because the wrap is wider at one end than at the opposite end, the stuffing being deposed on the wrap at the wide end of the wrap and folding onto the upper side of the stuffing those parts of the wider end of the wrap which protrude beyond the stuffing, after which the stuffing with the thus folded wide end of the wrap are rolled up towards the narrower end of the wrap such that the wrap is rolled around the stuffing.

According to the invention the wrap may be T-shaped or triangular shaped, but other shapes are also conceivable.

The above mentioned process can be effected in a machine which, according to the invention, is characterized by a belt conveyor, at least one optionally displaceable gate with such a configuration that normally flat strip-like marginal portions of the normally flat conveyor belt are curled upwardly and against the ceiling of the gate, and by a rolling device situated downstream of the gate.

According to the invention the gate or both gates may each preferably consist of two rollers which are perpendicular to the face of the conveyor belt and which each have a concave shaped roller surface such that strip like marginal portions of the conveyor belt are curled upwardly and against the ceiling of the gate by said rollers which are freely rotatable and driven into rotation by the conveyor belt.

The rolling device in the invented apparatus may preferably consist of a frame, a mechanism for upwardly and downwardly moving said frame with respect to the conveyor belt, two rollers rotatably mounted on said frame and a motor means for rotating said rollers.

The preparation of the wraps can be effected according to the invention by means of a press and a pressing case for pressing material to be cut into slices for the wraps in the shape of an oblong block, the cross section of the block having the shape which is desired for the wraps. Said block within the pressing case is frozen-in and after some time said block is pushed out of the pressing case and conveyed to a cutting machine for cutting slices from the block, said slices being deposed each as a wrap on the belt conveyor of the rolling device. The pressing case is located within a stationary lower support and an upper support which is vertically displaceable in the direction of the lower support, said supports keeping the pressing case in its place during pressing and protecting said press case against deformation which will otherwise happen because of strong forces which are developed within the pressing case during pressing. A pressing plate can be moved within the pressing case by means of a piston-cylinder unit, the end of the pressing case opposite to the end where the pressing plate is introduced, being adapted to be closed by means of a removable closing wall.

The above items and other characterizing features and advantages of the invention will be further indicated in the following description of an embodiment of the invented machine as indicated in the drawing, said machine by way of example being described in relation to preparing meat birds. However the present invention aims to provide a method and a machine to practice the method for rolling foods having in common a wrap and a filler. Examples of such food stuffs are meat birds, Chinese egg rolls, Mexican foods, like burritos, tortillas and cannelonie. If the wrap in a sheet of flour dough, conventional means instead of the invented press may be used for preparing wraps.

Figure 1:
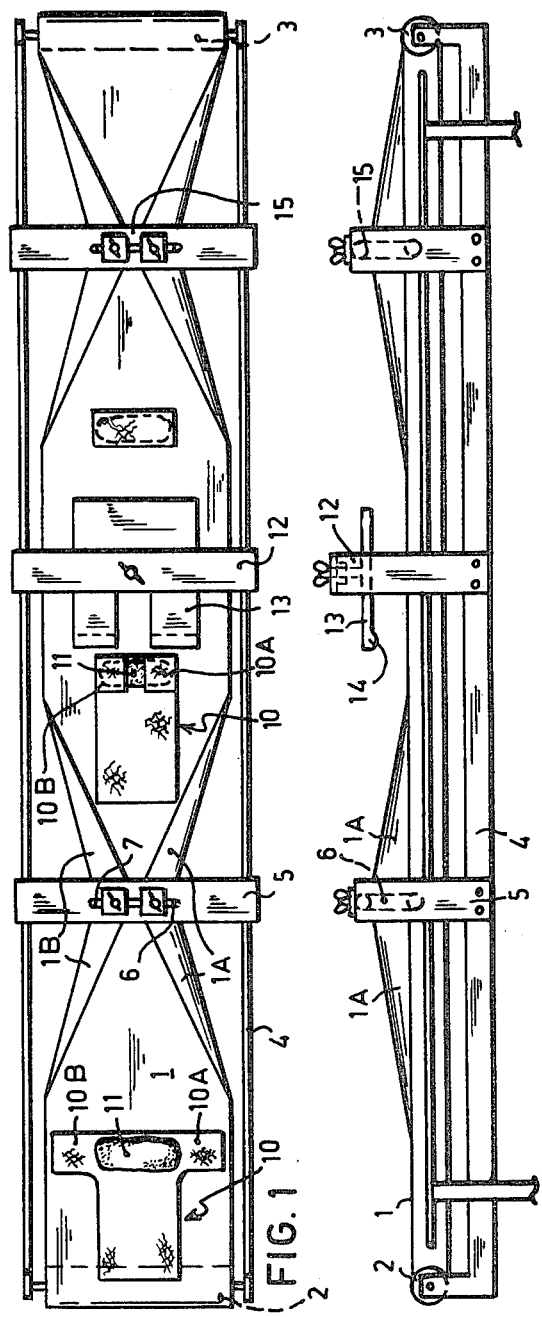
FIG. 1 is a plan view of the machine for rolling a stuffing in a wrap.
Figure 3:
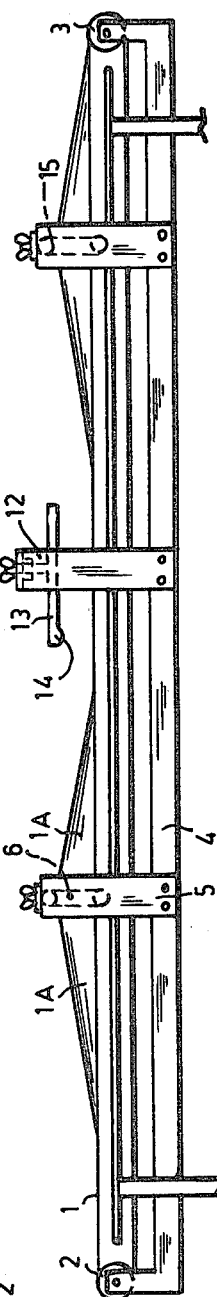
FIG. 3 is a side view of the machine according to FIG. 1.
Figure 4:
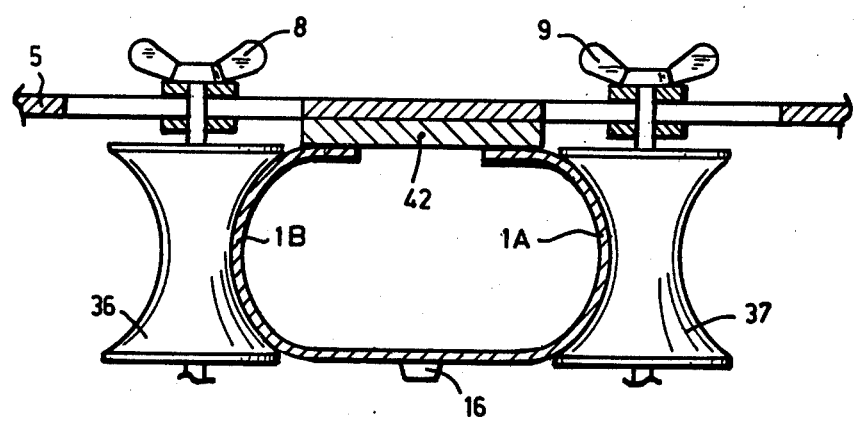
FIG. 4 is a front view of a preferred embodiment of the gate for curling upwardly strip-like marginal portions of the conveyor belt of the machine according to FIG. 1.

The invented machine for rolling a wrap around a stuffing consists according to FIGS. 1 and 3 of a conveyor belt 1, which extends along belt drums 2 and 3, the belt drums being mounted on a frame 4. Mounted on the frame is a support 5 on which a gate is secured, said gate preferably consisting of two freely rotatable rollers 36 and 37, each roller having a rolling surface which is curved in a concave manner, as indicated in FIG. 4. The axes of the two rollers are perpendicular to the surface of the conveyor belt. Both rollers are adjustable transversely to the length of the conveyor belt 1 and are adjustably secured to the gate by means of winged nuts 8 and 9. The conveyor belt 1 extends between the rollers 36 and 37 and thereby the normally flat strip-like marginal portions 1A and 1B of the normally flat conveyor belt 1 are curled upwardly along the rollers and against the ceiling 42 of the gate and beyond said gate these trip-like marginal portions are deflected in a gradual way, optionally forced by rollers, back to their normal flat position.

Figure 6:
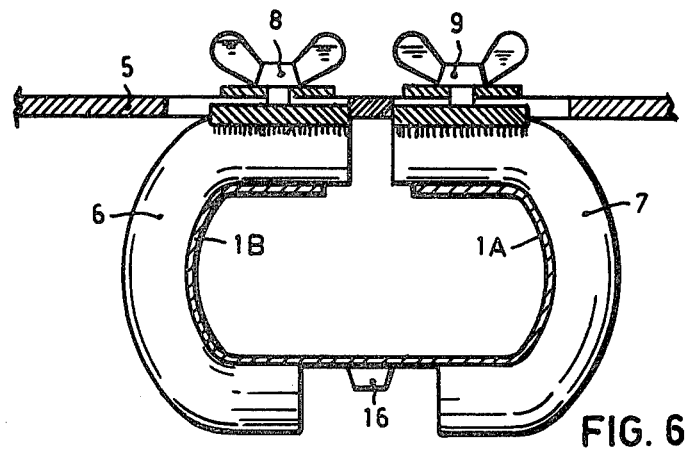
FIG. 6 is a front view of another embodiment of the gate with therein a portion of the conveyor belt of the machine according to FIG. 1.

Instead of the two rollers 36 and 37 according to FIG. 4, the gate can be provided with two U-shaped rods 6 and 7 according to FIG. 6. Both rods with round cross-section are also, in a direction transversely to the length of the conveyor belt, adjustably secured to the support 5 by means or winged nuts 8 and 9. The gate according to FIG. 4 with the freely rotatable rollers 36 and 37 is preferred, however, as said rollers freely rotate along with the moving conveyor belt 1 and therefore provide less friction than the friction between the moving conveyor belt 1 and the stationary rods 6 and 7.

Figure 2:
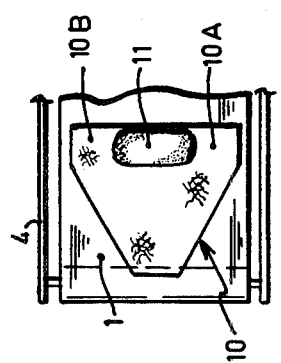
FIG. 2 is a plan view of the left part of the machine according to FIG. 1, where, however, the wrap on the conveyor belt is shown in the shape of a triangle.

In order to fold and roll a wrap around a stuffing, a wrap is placed at the left side of the gate 36, 37 or 6,7 on the conveyor belt according to FIG. 1, the wrap 10 being for instance T-shaped, as is also indicated in FIG. 1. The wrap may, however, also be triangularly shaped, as is indicated in FIG. 2, but anyway the wrap must be wider at one end than it is at the opposite end. At the wide end of the wrap 10, the stuffing 11 is deposed with its longitudinal axis transversely to the conveyor belt 1. As the initially flat conveyor belt according to FIG. 1 moves to the right and thereby through the gate 36, 37 or 6,7 the strip-like marginal portions 1A and 1B of the conveyor belt are curled upwardly and against the ceiling of the gate. Because of this curling of the belt, portions 10A and 10B of the wide end of the wrap, said portions protruding beyond the ends of the stuffing 11, are curled along until they are above the upper side of the stuffing. When doing so the situation as indicated in FIG. 1 directly at the right-hand side of the gate 6,7 is reached, in which the ends of the protruding portions 10A and 10B of the wrap are deposed on the stuffing 11.

Figure 7:
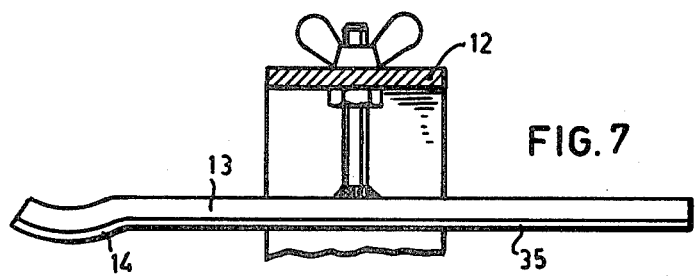
FIG. 7 is a side view of another embodiment of the rolling device which belongs to the machine according to FIG. 1.

After passing the gate 36, 37 or 6, 7 the conveyor belt 1 moves underneath a rolling device, which consists of a support 12, to which a U-shaped plate 13 is secured adjustable in height with respect to and parallel to the conveyor belt 1, as indicated in FIGS. 1 and 3. The upstream end 14 the rolling plate 13 is deflected downwardly as indicated in FIG. 7. The lower side of the plate 13 is provided with a coating 35 of the same kind of material as the kind of material of which the supporting surface of the conveyor belt 1 is made. Although it is not indicated, instead of the plate 13 the rolling device may consist of a secondary endless belt arranged above the conveyor belt 1, the direction of movement of the lower portion of said secondary endless belt being opposite to that of the upper portion of the conveyor belt, and the speed hereof being less than that of the conveyor belt.

As the wrap portions 10A and 10B, deposed on the stuffing 11 as is indicated at the left side of the support 12 in FIG. 1, contact the rolling plate 13, these wrap portions are retained by the rolling plate, whereas the remainder of the wrap 10 which is in contact with the conveyor belt 1 is moved along by the moving conveyor belt, so that the wrap 10 is rolled around the stuffing 11, resulting in a product as shown at the right-hand side of the support 12 in FIG. 1. In order to further shape the rolled-up wrap, a second gate 15 according to FIGS. 1 and 3 may be provided, if desired, and said gate can be constructed in the same manner as the gate 6, 7 or 36, 37.

Figure 5:
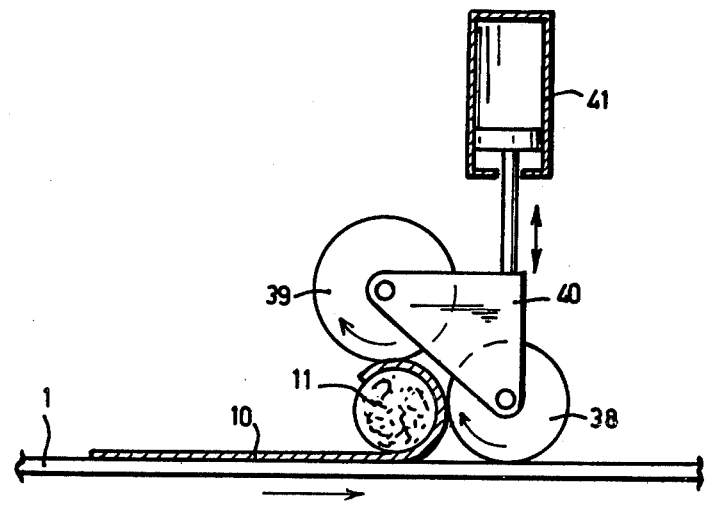
FIG. 5 is a schematic side view of a preferred embodiment of the rolling device which belongs to the machine according to FIG. 1.

The rolling device preferably consists, however, of a frame 40 which, according to FIG. 5, is movable upwardly and downwardly by means of a mechanism 41, for instance a hydraulically or pneumatically operating system with a piston and a cylinder. Two rollers 38 and 39 are secured to the frame 40 and are drivable by means of a motor (not shown) to make them rotate. When a stuffing 11 on a wrap 10 in FIG. 3, leaves the gate 6, 7 or 36, 37, the stuffing moves, by means of the conveyor belt 1, along for instance an electric eye by which the mechanism 41 is activated so that the frame 40 moves downwardly until the roller 38 is situated at a small distance above the belt, so in the position according to FIG. 5. As then, as indicated in FIG. 5, the stuffing 11 and the wrap 10 contact the rotating rollers 38 and 39, the stuffing together with these portions of the wrap which are in contact with the stuffing, are rolled on the remainder of the wrap 10 since the moving conveyor belt 1 moves said remainder of the wrap towards the roller 38. After the wrap is rolled around the stuffing in this manner, which takes a certain time, a time mechanism (not shown) activates the lift mechanism 41 by which the frame 40 with the roller 38, 39 is lifted so that the stuffing rolled in the wrap is conveyed by the conveyor belt to the right in FIG. 3 from the support 12.

In order to guide the conveyor belt 1 centrally through the gates 6, 7 or 36, 37 and, if present, through the gate 15, the conveyor belt 1 may be provided, if required, with a ridge 16 at its under side, as FIGS. 4 and 6 show, the belt drums 2 and 3, and optionally other support members for the conveyor belt, being provided with recesses in which said ridge fits accurately.

Figure 8:
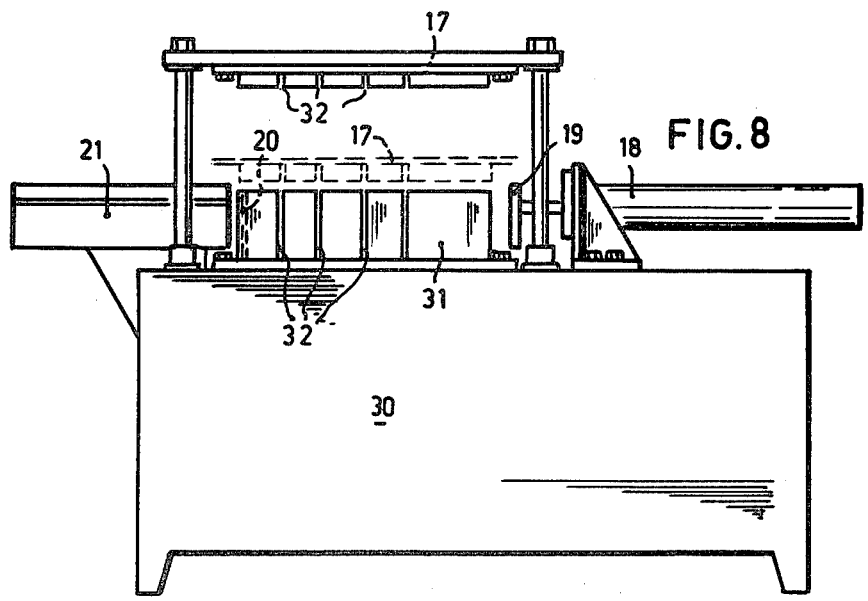
FIG. 8 is a side view of the press for the preparation of the wraps.
Figure 9:
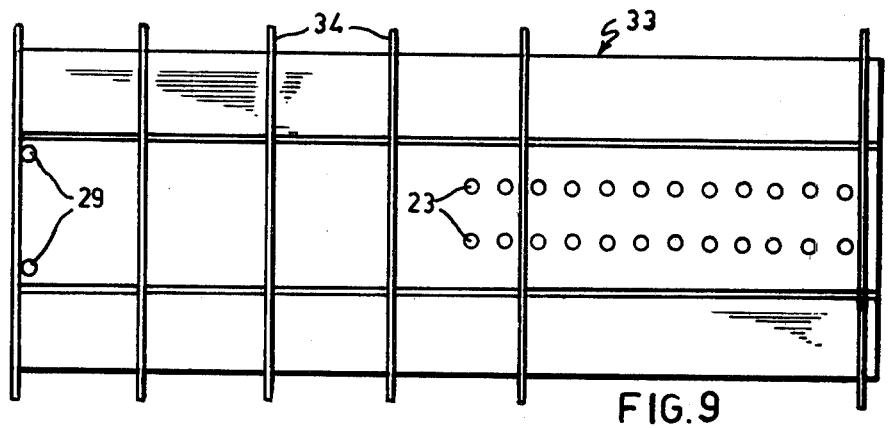
FIG. 9 is a plan view of the pressing case belonging to the press according to FIG. 8.
Figure 10:
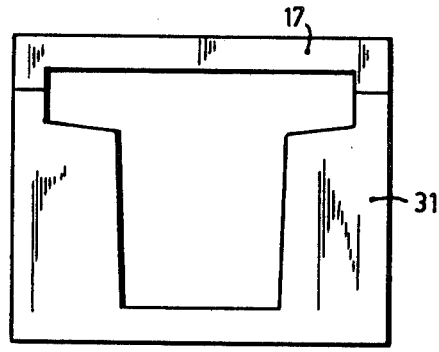
FIG. 10 shows an upper and lower support of the press, for containing the pressing case according to FIG. 9.
Figure 11:
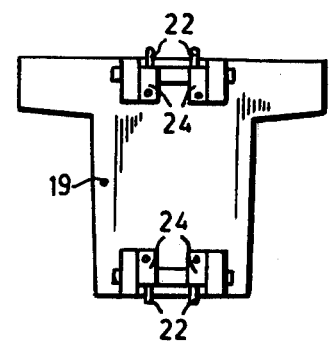
FIG. 11 is a front view of the pressing plate to be pushed within the pressing case according to FIG. 9.

For the preparation of the wraps, which in the event of meat birds consist of a sliced piece of meat as a wrap for chopped meat as a stuffing, for instance a press according to FIGS. 8 and 10 can be used. Said press consists of a stationarily mounted lower support 31 and an upper support 17 which is displaceable up and down with respect to the lower support. Both supports are provided with vertical slots 32. In the free space within the lower support 31 the pressing case 33 as shown in FIG. 9 is deposed after which the upper support is lowered onto the lower support. For keeping the pressing case firmly fixed in both supports flanges 34 are welded on the pressing case 33 and engage in the slots 32 of the two supports. Piston-cylinder units for moving the upper support 17 up and down are mounted in a housing 30 according to FIG. 8 and are not shown. By means of a hydraulic piston-cylinder unit 18 a pressing plate 19 can be pushed towards and into the pressing case 33. The left end of the pressing case can be closed by a closing wall 20. The tunnel formed by the upper support 17 and the lower support 31 as well as the pressing case 33 show in their cross-section the shape which is required for the wraps 10, like a T-shape as indicated in FIG. 10, but a triangular cross-section of the pressing case and the tunnel is also possible, if triangularly shaped wraps as according to FIG. 2 are required, whereas moreover other shapes for the wraps are conceivable. By deposing meat in the pressing case 33, deposing the pressing case in the lower support, putting the upper support 17 on the lower support 33, mounting the closing wall 20 in the pressing case and hydraulically pressing the pressing plate 19 into the pressing case, the meat is pressed to form an oblong block having a shape in cross-section which corresponds with the shape of the cross-section of the pressing case. After the meat is frozen and after the closing wall 20 is removed the shaped block of meat can be forced by the pressing plate 19 out of the pressing case into a discharge chute 21, after which the block of meat is cut into slices transversely to the length of the block, so that wraps 10 with the required shape are obtained. Said wraps are deposed one by one on the conveyor belt 1 according to FIG. 1, and they are further used as indicated above with respect to FIG. 1.

Figure 12:
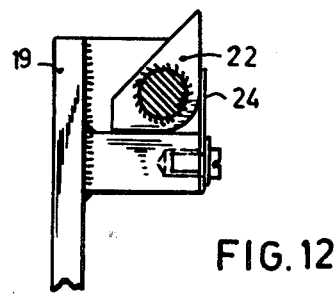
FIG. 12 is a partial side view of the pressing plate according to FIG. 11.

The pressing plate 19 is provided with pivotable pawls 22, which are forced in the position according to FIG. 12 by means of springs 24, so that they can project into holes 23 in walls of the pressing case according to FIG. 9. During pushing the pressing plate to the left through the pressing case, the pawls are automatically pivoted to the right by the walls of the pressing case against the force of the springs 24, to a position in which the pawls no longer protrude beyond the pressing plate 19 so that the pressing plate can be moved to the left through the pressing case. After the pressing plate has been pushed into the pressing case so far that the meat is under a pressure of for instance 2.5 tons, the meat must be frozen to for instance −35° C. while maintaining said pressure. For that purpose the pressing case is lifted from the supports 17, 31 of the press and placed in a freezing cell, while maintaining the pressure because the pawls 22 project into a pair of the pairs of holes 23 in walls of the pressing case, and thus lock the pressing plate 19 against movement to the right.

Figure 13:
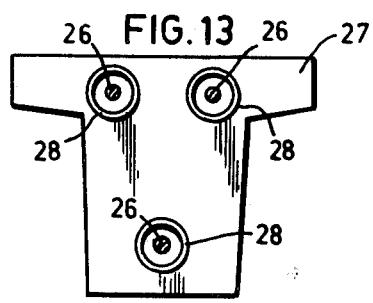
FIG. 13 is a plan view of the closing wall for the pressing case according to FIG. 9.
Figure 14:
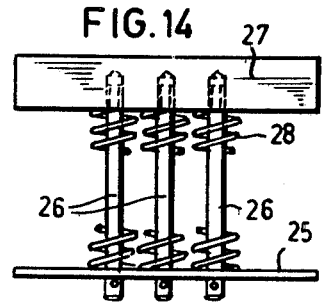
FIG. 14 is a front view of the closing wall according to FIG. 13.

Meat contains water and consequently by freezing said water, the meat expands. To balance said expansion the closing wall 20 according to FIGS. 14 and 13 is provided with a support plate 25 having holes therein, into which rods 26 project slidably, and a closing plate 27 being secured on the rods and springs 28 extending from the closing plate up to against the support plate. By means of pins projected into holes 29 in walls of the pressing case according to FIG. 9, the support plate 25 can be releasably fixed in the pressing case. The springs 28 are so strong that they can resist the pressure exerted on the meat by the pressing plate 19 or they can be temporarily supported for this purpose, but they can be depressed when the meat expands during freezing so that the closing plate 27 is forced towards the support plate 25, resulting in that during freezing the pressure on the meat does not exceed the pressure which is exerted during pressing.

What is claimed is:

1. Apparatus for preparing a wrapped food product of a stuffing and an edible wrap wherein the stuffing is of a predetermined length and thickness and the wrap comprises a first substantially rectangular portion, the long dimension of which exceeds the length of the stuffing and the short dimension of which is substantially equal to the thickness of the stuffing and a second portion extending from one of the long sides of the first substantially rectangular portion midway between its ends of a width at its proximal end at least equal to the length of the stuffing and of a length greater than the thickness of the stuffing with the long dimension of the stuffing positioned on the first substantially rectangular portion of the wrap with its long dimension paralleling the longitudinal dimension of said first substantially rectangular portion of the wrap and centered therein, the apparatus comprising a transversely-flexible, normally flat conveyor belt of a width exceeding the long dimension of the first substantially rectangular portion of the wrap, means supporting the conveyor belt for movement of a length thereof along a horizontal path, means for moving the conveyor belt continuously along said path with the wrap and stuffing deposited thereon, gate means stationary with respect to the movement of the conveyor belt comprising means positioned at opposite edges of the conveyor belt at a spacing narrower than the width of the conveyor belt between which the conveyor belt is moved continuously, said latter means having transversely-spaced, opposed, concave surfaces situated at a spacing corresponding substantially to the length of the stuffing and a horizontal surface parallel to the conveyor belt and spaced therefrom by an amount corresponding substantially to the thickness of the stuffing such that marginal portions of the flexible conveyor belt are curled upwardly at the ends of the stuffing and inwardly toward each other above and parallel to the medial portion of the conveyor belt as the conveyor belt moves relative to the gate to thus fold the end portions of the first substantially rectangular portion of the wrap extending beyond the ends of the stuffing about the ends and onto the upper side of the stuffing to cause them to adhere thereto, said gate means releasing the marginal portions of the conveyor belt as the latter leaves the gate means so that it returns to its normally flat condition and a rolling device supported above the conveyor belt beyond the gate means at a fixed position relative to the longitudinal movement of the conveyor belt and at a height therefrom to have contact with the folded-over end portions of the wrap as said end portions of the partially wrapped stuffing are moved into engagement therewith by the movement of the conveyor belt relative to the gate to roll the stuffing and wrap relative to the conveyor belt to dispose the second portion of the wrap in a coil about the stuffing.

2. Apparatus according to claim 1 wherein the gate means comprises two rollers of an axial length corresponding substantially to the thickness of the stuffing supported at opposite edges of the conveyor belt with their lower ends at substantially the level of the plane of the conveyor belt for rotation about axes perpendicular to the plane of the conveyor belt, said rollers having opposed, concave-shaped surfaces between which the marginal portions of the belt are confined as the belt moves relative to the gate, said rollers being freely rotatable and driven in rotation by the movement of the conveyor belt relative thereto and wherein said rolling device is a rigid platen mounted above the conveyor belt and stationary with respect to the movement of the conveyor belt having a horizontal surface parallel to the conveyor belt and extending transversely thereof.

3. Apparatus according to claim 1 wherein the rolling device consists of a frame which is stationary with respect to movement of the conveyor belt, means mounting the frame for adjustment upwardly and downwardly relative to the surface of the conveyor belt, two rollers rotatably mounted on the frame for rotation about spaced, parallel axes transverse to and parallel to the surface of the conveyor belt, one of said rollers having tangential engagement with the conveyor belt and being driven in rotation thereby and the other being supported above the conveyor belt such that its surface is at a height therefrom corresponding substantially to the thickness of the stuffing so as to have tangential contact with the folded end portions of the wrap at the top of the stuffing.

4. Apparatus according to claim 1 wherein the rolling device comprises a structure defining a downwardly-facing surface parallel to the surface of the conveyor belt and at a height therefrom corresponding to substantially the thickness of the stuffing for frictional contact with the end portions of the wrap as the stuffing and wrap are moved relative thereto.

5. Apparatus according to claim 1 wherein the rolling device consists of a secondary endless belt, means supporting the secondary endless belt with a length thereof above and spaced from the conveyor belt at a distance corresponding to substantially the thickness of the stuffing and means for moving the secondary endless belt in a direction such that said length is moved in a direction opposite to the conveyor belt at a speed less than that of the conveyor belt.

* * * * *